United States Patent
Nakashima

[11] Patent Number: 5,562,570
[45] Date of Patent: Oct. 8, 1996

[54] TROUBLESHOOTING METHOD FOR OPERATING CONDITION DETECTING DEVICE

[75] Inventor: Yasuhiro Nakashima, Kyoto, Japan

[73] Assignee: Mitsubishi Jidosha Kogyo Kabushiki Kaisha, Tokyo, Japan

[21] Appl. No.: 441,315

[22] Filed: May 15, 1995

Related U.S. Application Data

[62] Division of Ser. No. 73,050, Jun. 8, 1993, Pat. No. 5,439,426.

[30] Foreign Application Priority Data

Jun. 12, 1992 [JP] Japan .................................. 4-153173

[51] Int. Cl.$^6$ ................................................. F16H 61/26
[52] U.S. Cl. ................... 477/127; 477/906; 364/424.1; 364/424.03; 364/431.07; 73/118.1
[58] Field of Search ..................... 477/121, 127, 477/906; 73/118.1, 1 E; 364/424.03, 424.1, 431.07

[56] References Cited

U.S. PATENT DOCUMENTS

| | | |
|---|---|---|
| 4,635,508 | 1/1987 | Tatsumi . |
| 4,667,541 | 5/1987 | Shimaoka et al. . |
| 4,835,694 | 5/1989 | Yamamoto et al. . |
| 4,841,815 | 6/1989 | Takahashi . |
| 4,951,206 | 8/1990 | Kyohzuka . |
| 5,027,647 | 7/1991 | Shimanaka . |
| 5,124,916 | 6/1992 | Tokoro et al. . |
| 5,129,287 | 7/1992 | Asada et al. . |
| 5,243,854 | 9/1993 | Ishida ......................... 73/118.1 |

FOREIGN PATENT DOCUMENTS

| | | |
|---|---|---|
| 241216 | 10/1987 | European Pat. Off. . |
| 0347261 | 12/1989 | European Pat. Off. . |
| 449424 | 10/1991 | European Pat. Off. . |
| 0503948 | 9/1992 | European Pat. Off. . |
| 63-246546 | 10/1988 | Japan . |
| 63-246456 | 10/1988 | Japan . |
| 23738 | 1/1990 | Japan . |
| 2003738 | 1/1990 | Japan . |
| 3084254 | 4/1991 | Japan . |
| 3163258 | 7/1991 | Japan . |
| 3163259 | 7/1991 | Japan . |
| 3163257 | 7/1991 | Japan . |
| 3204428 | 9/1991 | Japan . |
| 2090926 | 7/1982 | United Kingdom . |

*Primary Examiner*—Edward K. Look
*Assistant Examiner*—Christopher Verdier

[57] ABSTRACT

A speed change control method for a vehicular automatic transmission, in which the transmission stage position of the automatic transmission having a plurality of transmission stages is changed to an optimum transmission stage set by fuzzy inference on the basis of parameter values indicative of the operating conditions of a vehicle. If a failure of any of sensors for detecting the parameter values concerned in the fuzzy inference is detected, setting the optimum transmission stage by the fuzzy inference is inhibited, and the optimum transmission stage is set in a speed change control mode which is not dependent upon the broken sensor. Thus, even in case of failure of a sensor, the vehicle can be driven without hindrance and without discomfort to a driver or fellow passengers.

16 Claims, 10 Drawing Sheets

TROUBLESHOOTING METHOD FOR OPERATING CONDITION DETECTING DEVICE

This application is a divisional of application Ser. No. 08/073,050, filed on Jun. 8, 1993, now U.S. Pat. No. 5,439,426, the entire contents of which are hereby incorporated by reference.

BACKGROUND OF THE INVENTION

The present invention relates to a speed change control apparatus for a vehicular automatic transmission and a troubleshooting method for operating a condition detecting device. More particularly, it relates to an apparatus for speed change control upon failure of a sensor and a troubleshooting method for troubleshooting various sensors, in a speed change control apparatus for setting an optimum transmission stage by fuzzy inference in accordance with operation information from the various sensors.

In a conventional vehicular automatic transmission, shift patterns are prestored in accordance with the throttle opening (engine load) and the velocity of a vehicle, and the transmission stage is set in accordance with the detected throttle opening and vehicle velocity by using the shift patterns, whereby a transmission gear shift Is made automatically. According to this conventional automatic speed change control method (non-fuzzy speed change control method), the transmission gear shift can be carried out without any substantial problems when the vehicle is running on a level road, such as one in an urban district, and a speed change can be smoothly made without a shock. Among roads between mountains, however, there are straight ascending roads, winding ascending roads which bend frequently, descending slopes which require positive engine braking, and long gentle downward slopes. Some drivers may suddenly accelerate the vehicle on a downward slope and apply the brakes hard immediately before approaching a corner. While the vehicle is running between the mountains in this manner, it is rather difficult to select an optimum transmission stage for the vehicle operating conditions, driver's intention, road conditions, etc. Accordingly, there is a demand for an arrangement which ensures simple operation, higher vehicle mobility, and better driving feeling for vehicle drives between mountains.

To meet this demand, speed change control methods have been proposed in which the optimum transmission stage corresponding to the aforesaid vehicle operating conditions and the like is selected by executing the so-called fuzzy control. These methods are described, for example, in Published Unexamined Japanese Patent Applications Nos. 63-246546 and 02-3738. According to these conventional speed change control methods (fuzzy speed change control methods), the optimum transmission stage is set by estimating all shift positions for drives in urban districts or between mountains by fuzzy inference. Thus, those conventional speed change control methods based on the fuzzy control are subject to a drawback, namely that many rules are required and membership functions are complicated. Further, their practical application requires use of a large-capacity computer. According to these methods which require many rules and complicated membership functions, tuning is difficult. Therefore, it is also difficult to adapt the application to various kinds of vehicles.

If the speed change control methods based on the fuzzy control are newly adopted, furthermore, drivers who are accustomed to driving vehicles on ordinary level roads, such as ones in urban districts, may have an uneasy feeling as a transmission gear shift is caused by a minor change of the operating conditions, such as clearing a small bump, a slight additional press on the accelerator pedal, etc., which conventionally do not cause a gear shift.

To cope with this, an alternative speed change control method has been proposed in which the optimum transmission stage is selected by fuzzy inference with respect to winding roads between mountains or ascending roads, and the optimum transmission stage is selected from previously set shift patterns in accordance with the vehicle velocity and throttle value opening when the vehicle is running on level roads in urban districts and the like. According to this speed change control method, fine speed change control can be effected depending on the various conditions of the roads between mountains, driver's intentions, etc. without requiring use of any large-capacity computer.

In a fuzzy speed change control mode for setting the optimum transmission stage by the aforesaid fuzzy inference, various sensors must be used to obtain various kinds of information on the engine operation, vehicle conditions, road conditions, driver's intentions, etc. If any of these sensors utilized in the fuzzy inference is in trouble, the optimum transmission stage may be diagnosed incorrectly from abnormal data from this broken sensor. During a steady-state drive (constant-speed drive) on a level road, for example, therefore, a downward gear shift may possibly be executed suddenly to cause engine braking, thereby making the driver feel uncomfortable or uneasy.

OBJECT AND SUMMARY OF THE INVENTION

The present invention has been contrived in consideration of these circumstances, and an object of the invention is to provide a speed change control apparatus for a vehicular automatic transmission designed so that a vehicle can be driven without hindrance and without discomforting a driver or fellow passengers even in case of failure of a sensor.

Another object of the present invention is to provide a troubleshooting method for securely troubleshooting various sensors.

These objects, according to an aspect of the present invention, are achieved by providing a speed change control apparatus for a vehicular automatic transmission, including an operating condition detecting device for detecting the operating conditions of a vehicle, which changes the transmission stage position of the automatic transmission, having a plurality of transmission stages, in accordance with the output value of the vehicle operating condition detecting device. The speed change control apparatus comprises: first transmission stage setting means for setting the optimum transmission stage of the automatic transmission by fuzzy inference based on the output value of the operating condition detecting device; failure detecting means for detecting the presence of a failure of the operating condition detecting device; and fuzzy inference inhibiting means for inhibiting the first transmission stage setting means from setting the optimum transmission stage by the fuzzy inference when the presence of a failure of the operating condition detecting means is detected.

Preferably, the speed change control apparatus further comprises second transmission stage setting means for setting the optimum transmission stage of the automatic transmission by any procedure other than the fuzzy inference, and first selecting means for selecting the second transmission stage setting means when the first transmission stage setting means is inhibited from setting the optimum transmission stage by the fuzzy inference. More preferably, the operating condition detecting device includes a detecting device for detecting vehicle velocity and a detecting device for detecting engine load. The second transmission stage setting means includes reference speed change means for setting the optimum transmission stage of the automatic transmission in accordance with the detected vehicle velocity and the detected engine load, and transmission stage fixing means for fixing the optimum transmission stage to a predetermined transmission stage. The speed change control apparatus further comprises second selecting means for selecting the optimum transmission stage setting by means of the transmission stage fixing means when a failure of at least one of the device for detecting vehicle velocity and the device for detecting engine load is detected.

According to another aspect of the present invention, the speed change control apparatus comprises: first transmission stage setting means for setting the optimum transmission stage of the automatic transmission by fuzzy inference based on the output value of the operating condition detecting device and a plurality of predetermined control rules; failure detecting means for detecting the presence of a failure of the operating condition detecting device; and control rule conclusion inhibiting means for inhibiting only the conclusion of those control rules, among the control rules, which are dependent upon the output value of the operating condition detecting device when the presence of a failure of the operating condition detecting device is detected.

According to still another aspect of the present invention, there is provided a troubleshooting method for a brake sensor in a speed change control apparatus for a vehicular automatic transmission, including brake sensor for detecting the operating conditions of a brake unit mounted in a vehicle, which changes the transmission stage position of the automatic transmission having a plurality of transmission stages in accordance with the output value of the brake sensor. This troubleshooting method comprises steps of: determining the running state of the vehicle; detecting the output value of the brake sensor when it is determined that the vehicle is running; determining whether the brake unit is operating in accordance with the output value of the brake sensor; measuring a time period during which the brake unit is determined to be operating; and concluding that the brake sensor is operating abnormally when the measured time period exceeds a predetermined time period.

According to a further aspect of the present invention, there is provided a troubleshooting method for a throttle opening sensor in a speed change control apparatus for a vehicular automatic transmission, including the throttle opening sensor for detecting the opening of a throttle valve used in controlling the intake air amount of an engine, which changes the transmission stage position of the automatic transmission having a plurality of transmission stages in accordance with the output value of the throttle opening sensor. This troubleshooting method comprises steps of: detecting a rotation speed of the engine; determining, by use of a fully-closed throttle detecting device, whether the throttle valve is fully closed when the detected engine rotation speed is within a predetermined rotation speed range; detecting the output value of the throttle opening sensor when the throttle valve is determined to be fully closed; determining whether the detected output value is at least equal to a predetermined value; measuring a time period during which the output value is determined to be at least equal to the predetermined value; and concluding that the throttle opening sensor is operating abnormally when the measured time period exceeds a predetermined time period.

Preferably, the predetermined rotation speed range is set to a low-speed region of the engine, and the predetermined value is set to an output value of the throttle opening sensor obtained when the throttle valve is substantially fully open.

According to a further aspect of the present invention, there is provided a troubleshooting method for a throttle opening sensor in a speed change control apparatus for a vehicular automatic transmission, including throttle opening sensor for detecting the opening of a throttle valve used in controlling the intake air amount of an engine, which changes the transmission stage position of the automatic transmission having a plurality of transmission stages in accordance with the output value of the throttle opening sensor. This troubleshooting method comprises steps of: detecting a rotation speed of the engine; determining, by use of a fully-closed throttle detecting device whether the throttle valve is fully closed when the detected engine rotation speed is at least equal to an upper limit of a predetermined rotation speed range; detecting the output value of the throttle opening sensor when the throttle valve is determined to be open; determining whether the detected output value is at most equal to a predetermined value; measuring a time period during which the output value is determined to be at most equal to the predetermined value; and concluding that the throttle opening sensor is operating abnormally when the measured time period exceeds a predetermined time period.

Preferably, the predetermined rotation speed range is set to a high-speed region of the engine, and the predetermined value is set to an output value of the throttle opening sensor obtained when the throttle valve is substantially fully closed.

According to a further aspect of the present invention, there is provided a troubleshooting method for an output shaft rotation speed sensor in a speed change control apparatus for a vehicular automatic transmission, including the output shaft rotation speed sensor for detecting the rotation speed of the output shaft of the automatic transmission mounted in a vehicle, which changes the transmission stage position of the automatic transmission having a plurality of transmission stages in accordance with the output value of the output shaft rotation speed sensor. This troubleshooting method comprises steps of: detecting a velocity of the vehicle by use of vehicle velocity detecting device; detecting the output value of the output shaft rotation speed sensor when the detected vehicle velocity is at least equal to a predetermined velocity; determining the ratio between the detected vehicle velocity and the detected output value of the output shaft rotation speed sensor; determining whether the determined ratio is at most equal to a predetermined value; measuring a time period during which the ratio is determined to be at most equal to the predetermined ratio; and concluding that the output shaft rotation speed sensor is operating abnormally when the measured time period exceeds a predetermined time period.

According to another aspect of the present invention, there is provided a troubleshooting method for a turbine speed sensor in a speed change control apparatus for a vehicular automatic transmission, including the turbine speed sensor for detecting the turbine speed of a fluid coupling connected to an input shaft of the automatic transmission, which changes the transmission stage position of the automatic transmission having a plurality of transmission stages in accordance with the output value of the turbine speed sensor. This troubleshooting method comprises steps of: detecting a velocity of the vehicle; detecting the output value of the turbine speed sensor when the detected vehicle velocity is at least equal to a first predetermined value; determining whether the detected output value is equal to a second predetermined velocity; measuring a time period during which the output value of the turbine speed sensor is determined to be equal to the second predetermined value; and concluding that the turbine speed sensor is operating abnormally when the measured time period exceeds a predetermined time period.

According to still another aspect of the present invention, there is provided a troubleshooting method for an engine speed sensor in a speed change control apparatus for a vehicular automatic transmission, including the engine speed sensor for detecting the rotation speed of an engine, which changes the transmission stage position of the automatic transmission having a plurality of transmission stages in accordance with the output value of the engine speed sensor. This troubleshooting method comprises steps of: detecting the transmission stage position of the automatic transmission; detecting a velocity of the vehicle when the automatic transmission is detected to be operating in a forward-stage position; detecting the output value of the engine speed sensor when the detected vehicle velocity is at least equal to a first predetermined value; determining whether the detected output value is equal to a second predetermined value; measuring a time period during which the output value of the engine speed sensor is determined to be equal to the second predetermined value; and concluding that the engine speed sensor is operating abnormally when the measured time period exceeds a predetermined time period.

According to a further aspect of the present invention, there is provided a speed change control method for a vehicular automatic transmission, including operating condition detecting means for detecting the operating conditions of a vehicle, which changes the transmission stage position of the automatic transmission having a plurality of transmission stages in accordance with the output value of the operating condition detecting means. This speed change control method comprises steps of: setting the optimum transmission stage of the automatic transmission by fuzzy inference based on the output value of the operating condition detecting device; detecting the presence of a failure of the operating condition detecting device; and inhibiting the optimum transmission stage from being set by the fuzzy inference when the presence of a failure of the operating condition detecting device is detected.

Preferably, the optimum transmission stage of the automatic transmission is set by any procedure other than the fuzzy inference, when the optimum transmission stage is inhibited from being set by the fuzzy inference. Also, the optimum transmission stage of the automatic transmission is set in accordance with output values from a vehicle velocity detecting device and an engine load detecting device of the operating condition detecting device when any other detecting device included as part of the operating condition detecting device is operating abnormally. Further, the optimum transmission stage of the automatic transmission is fixed to a predetermined transmission stage when at least one of the vehicle velocity detecting device and the engine load detecting device is operating abnormally.

According to a still further aspect of the present invention, there is provided a speed change control method for a vehicular automatic transmission, including operating condition detecting means for detecting the operating conditions of a vehicle, which changes the transmission stage position of the automatic transmission having a plurality of transmission stages in accordance with the output value of the operating condition detecting device. This speed change control method comprises steps of: setting the optimum transmission stage of the automatic transmission by fuzzy inference based on the output value of the operating condition detecting device and a plurality of predetermined control rules; detecting the presence of a failure of the operating condition detecting device; and inhibiting only the conclusion of those control rules, among the plurality of predetermined control rules, which are dependent upon the output value of the operating condition detecting device when the presence of a failure of the operating condition detecting device is detected.

An advantage of the speed change control apparatus of the present invention lies in that the optimum transmission stage is inhibited from being set by the fuzzy inference when a failure of any of sensors, for detecting parameter values concerned in the fuzzy inference, is detected. Thus, the vehicle can be driven without hindrance and without discomforting a driver or fellow passengers, even in case of failure of a sensor.

In a specific aspect of the present invention in which a plurality of rules are used for the fuzzy inference, only the conclusion of those rules which are dependent upon the abnormally functioning sensor is inhibited, and the optimum transmission stage is set by the fuzzy inference using those rules in which normally functioning sensors are concerned. In another specific aspect of the present invention, first transmission stage setting means for setting the optimum transmission stage by fuzzy inference is provided in combination with second transmission stage setting means for setting the optimum transmission stage by any procedure, other than the fuzzy inference. If the broken (abnormally functioning) sensor is utilized in the transmission stage setting by means of the first transmission stage setting means, in this case, the optimum transmission stage is set by means of the second transmission stage setting means. If the broken sensor is utilized in the transmission stage setting by means of the second transmission stage setting means, on the other hand, the optimum transmission stage is fixed to a predetermined transmission stage. According to these aspects, the transmission stage can be set more properly in case of failure of a sensor.

An advantage of the troubleshooting method of the present invention lies in that troubleshooting for the various sensors can be made securely. Thus, there is no possibility of misjudgment, detecting a failure where there is no actual failure, and vice versa, so that an unexpected speed change can be prevented.

These and other objects and advantages will become more readily apparent from an understanding of the preferred embodiments described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which.

DETAILED DESCRIPTION OF THE PREFERRED EMBODIMENTS

The following is a description of a vehicular automatic transmission furnished with a speed change control apparatus according to one embodiment of the present invention.

Figure 1:
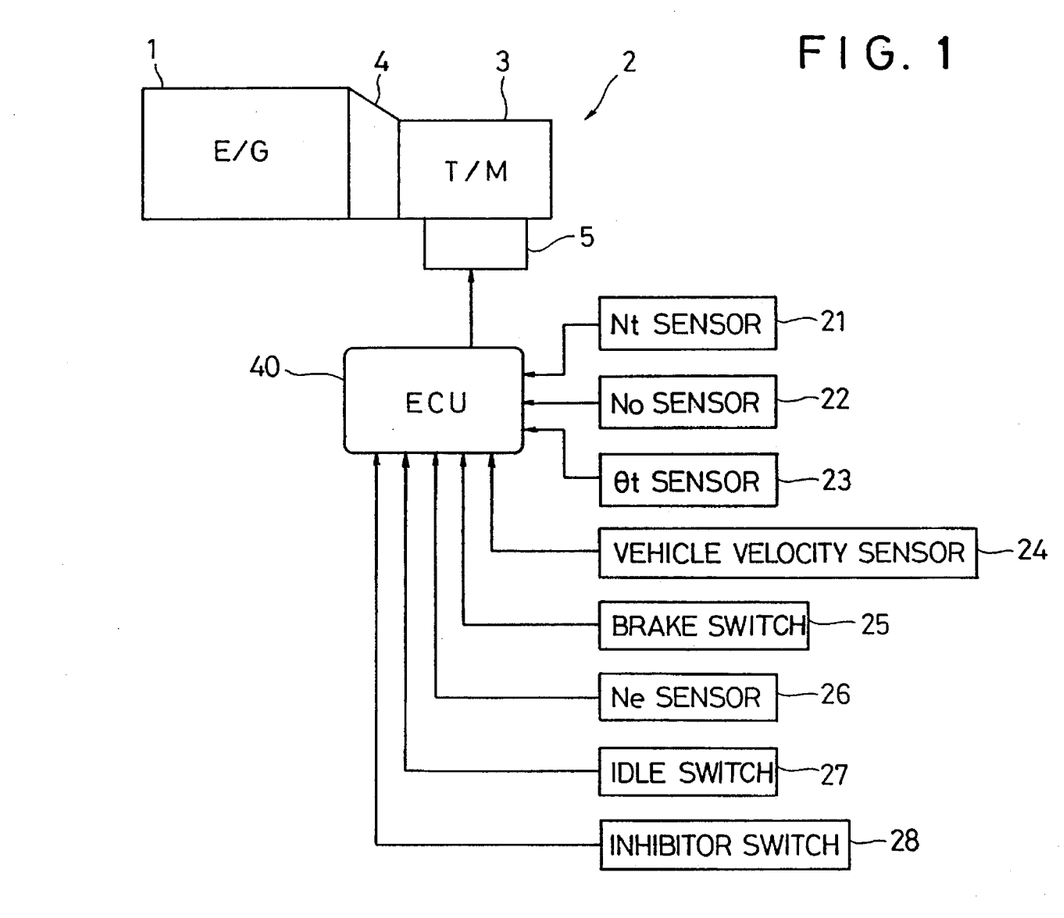
FIG. 1 is a diagram showing an outline of a vehicular automatic transmission for carrying out a method according to the present invention.

In FIG. 1, numeral 1 denotes an internal combustion engine. The output of the engine 1 is transmitted to driving wheels (not shown) through an automatic transmission 2. The automatic transmission 2 includes a torque converter 4, a speed change gear system 3, a hydraulic circuit 5, a controller 40, etc. The speed change gear system 3 is provided with, for example, a four-forward-, one-reverse-gear transmission stage and transmission frictional engagement elements, such as a number of hydraulic clutches and hydraulic brakes, for transmission stage position change or speed change operation. The hydraulic circuit 5 includes duty cycle controlled solenoid valves (hereinafter referred to simply as solenoid valves) which correspond individually to the transmission frictional engagement elements, and can operate these engagement elements, i.e., the clutches and brakes, independently of one another. The solenoid valves, which are connected electrically to the output side of the controller 40 (mentioned later), adjust the pressure of hydraulic oil to be supplied to the frictional engagement elements in response to driving signals from the controller 40.

Figure 2:
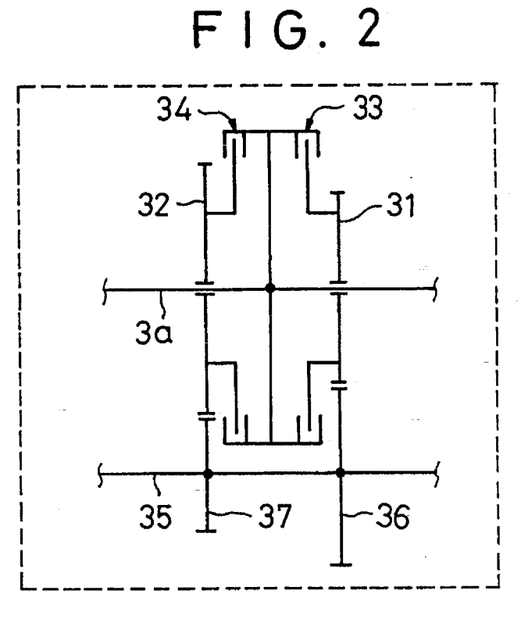
FIG. 2 is a diagram schematically showing part of a gear train in a speed change gear system shown in FIG. 1.

Referring to FIG. 2, first and second driving gears 31 and 32 are rotatably arranged around an input shaft 3a. Also, hydraulic clutches 33 and 34, for use as transmission frictional engagement elements, are fixed to that portion of the input shaft 3a which is situated between the gears 31 and 32. When engaged with the clutches 33 and 34, respectively, the driving gears 31 and 32 rotate integrally with the input shaft 3a.

Further, an intermediate transmission shaft 35, which extends parallel to the input shaft 3a, is connected to a driving axle through final reduction gears (not shown). First and second driven gears 36 and 37, which are fixed to the intermediate transmission shaft 35, are in mesh with the driving gears 31 and 32, respectively.

When the clutch 33 is engaged, therefore, the rotation of the input shaft 3a is transmitted to the intermediate transmission shaft 35 through the clutch 33, first driving gear 31, and first driven gear 36, whereupon a first transmission stage (e.g., first or low speed) is established. When the clutch 34 is engaged, on the other hand, the rotation of the input shaft 3a is transmitted to the intermediate transmission shaft 35 through the clutch 34, second driving gear 32, and second driven gear 37, whereupon a second transmission stage (e.g., second speed) is established.

The automatic transmission 2 is shifted up from the low speed to the second speed by engaging the second-speed clutch 34 while disengaging the low-speed clutch 33 which has been engaged. In contrast with this, the automatic transmission 2 is shifted down from the second speed to the low speed by engaging the clutch 33 while disengaging the clutch 34 which has been engaged.

Figure 3:
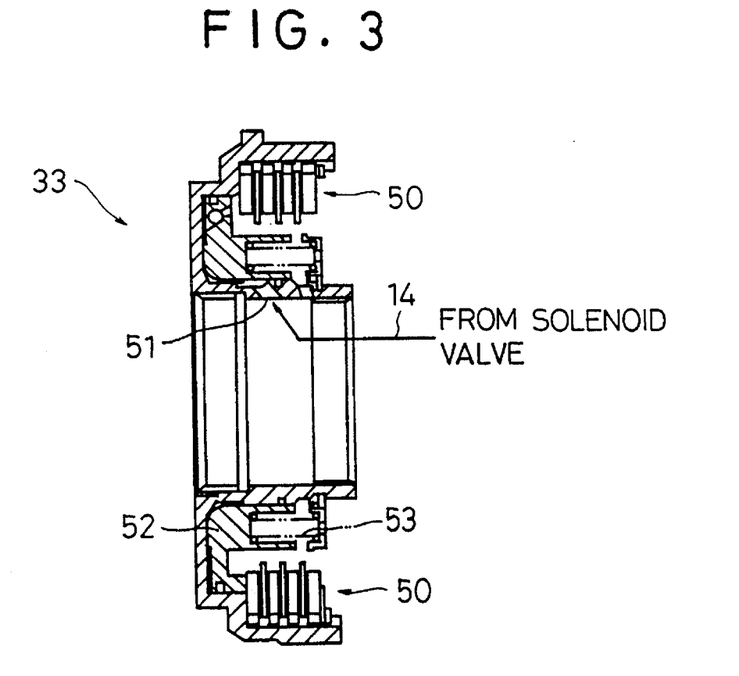
FIG. 3 is a sectional view showing an arrangement of a hydraulic clutch shown in FIG. 2.

For example, hydraulic multi-plate clutches are used for the clutches 33 and 34, and FIG. 3 shows an example of the clutch 33. The clutch 33 comprises a number of frictional engagement plates 50. When the hydraulic oil is fed from an oil passage 14 into the clutch 33 through a port 51, a piston 52 advances to bring the frictional engagement plates 50 into frictional engagement with one another. When the piston 52, pressed by a return spring 53, returns while allowing the hydraulic oil to be discharged through the port 51 into the oil passage 14, the frictional engagement plates 50 are released from the frictional engagement. The clutch 34 is constructed in the same manner as the clutch 33.

The controller 40 contains memories therein, such as a ROM, RAM, etc., a central processing unit, input and output units, a counter, and the like, none of which are shown. As shown in FIG. 1, various sensors are connected electrically to the input side of the controller 40. The sensors include, for example, an input shaft rotation speed (Nt) sensor 21 for detecting the turbine speed of the torque converter 4, that is, the rotation speed Nt of the input shaft of the speed change gear system 3; an output shaft rotation speed (No) sensor 22 for detecting the rotation speed No of a transfer drive gear (not shown); a throttle opening sensor 23 ($\theta$ t sensor) for detecting the valve opening $\theta$ t of a throttle valve disposed in the middle of a suction passage (not shown) of the engine 1; and a vehicle velocity sensor 24 for delivering an on- or off-signal corresponding to the vehicle velocity, the sensor 24 having a reed switch which opens or closes in response to the action of a magnet adapted to rotate at a speed corresponding to the vehicle velocity. The sensors further include a brake switch (SW) 25 adapted to deliver an on-signal when a driver steps on a foot brake pedal; an engine speed (Ne) sensor 26 for detecting the rotation speed Ne of the engine 1; an idle switch (IDSW) 27 adapted to deliver an on-signal when the aforesaid throttle valve is fully closed; and an inhibitor switch 28 adapted to detect the shift position of a select lever (not shown) and deliver position signals corresponding to a parking position, forward-stage position, etc. These sensors 21 to 38 supply detection signals to the controller 40.

Figure 4:
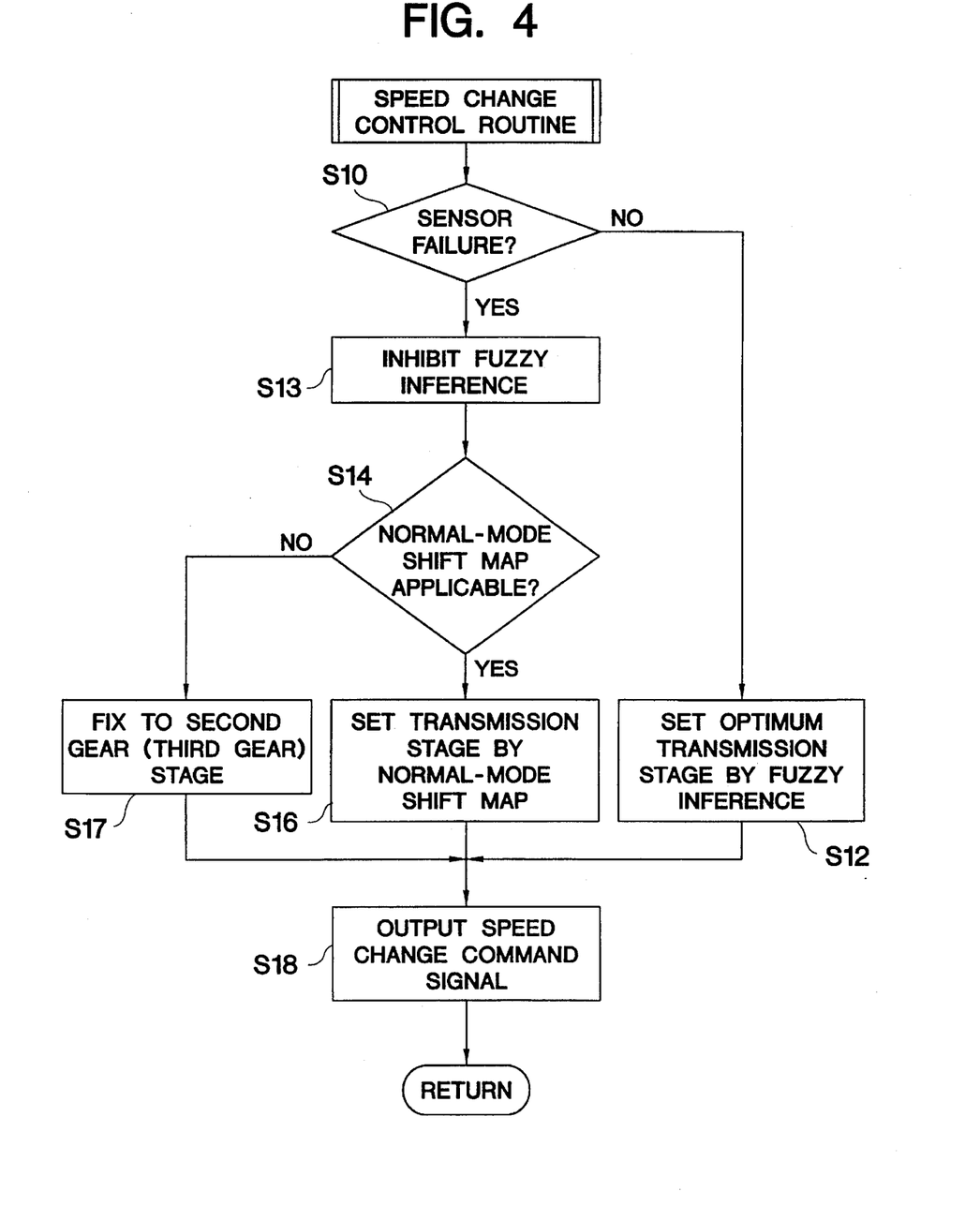
FIG. 4 is a flow chart showing a speed change control routine executed by means of a controller shown in FIG. 1.

Referring now to FIG. 4, a speed change control routine executed by means of the controller 40 will be described.

The controller 40 is provided with a fuzzy speed change control mode for setting the optimum transmission stage by fuzzy inference; a normal speed change control mode (non-fuzzy speed change control mode) for setting the optimum transmission stage in accordance with the vehicle velocity and engine load (throttle opening); and a fixing mode (non-fuzzy speed change control mode) for fixing the transmission stage position to the second gear stage (or third gear stage), the fixing mode being applied to a state of emergency. Using these speed change control modes, the controller 40 sets the optimum transmission stage in the following manner.

The controller 40 first determines in Step S10 whether or not any of the sensors concerned in the fuzzy inference are in trouble (operating abnormally). The sensors concerned in the fuzzy inference for setting the optimum transmission stage include, for example, the brake switch 25, throttle opening sensor 23, input shaft rotation speed (Nt) sensor 21, output shaft rotation speed (No) sensor 22, engine speed (Ne) sensor 26, etc. Whether or not any of these sensors are in trouble is determined according to various troubleshooting routines, which will be mentioned later.

If the result of decision in Step S10 is NO, that is, if none of the sensors concerned in the fuzzy inference are in trouble, the program proceeds to Step S12. In Step S12 a fuzzy speed change mode is established, and the optimum transmission stage is set by the fuzzy inference. Various methods have been proposed for setting the transmission stage by the fuzzy inference, and any of these methods can be adopted without limitation. For example, the transmission stage may be set in the following manner.

In order to draw the fuzzy inference from the respective detected values of the vehicle velocity, acceleration, throttle opening, brake switch signal, and transverse or lateral acceleration acting on a vehicle body (i.e., parameters Indicative of the vehicle operating conditions, road conditions, driver's intention to drive, etc.) and a plurality of fuzzy rules (control rules) which correspond individually to a plurality of vehicle running modes (level road running mode, winding road ascending mode, winding road descending mode, straight road slope ascending mode, etc.), the parameter values detected by means of the various sensors are read by the controller 40. Then, membership values for the respective items (corresponding to the parameters) of the conclusions of the fuzzy rules, which are obtained by computation based on the detected parameter values and membership functions indicative of fuzzy subsets associated with the antecedent items, are MIN-synthesized, for example, for all the items, whereby the degrees of adaptation or conformity between the detected parameter values and the individual fuzzy rules are determined. Further, a first inference output obtained by cutting membership functions associated with the respective conclusions (optimum transmission stages) of the fuzzy rules with use of these adaptation degrees is MAX-synthesized, for example, for all the fuzzy rules, whereupon a second inference output is obtained. Finally, the second inference output is made to be defuzzified, whereby the optimum transmission stage is determined.

As described above, the controller 40, based on the adaptation of the current vehicle operating conditions, road conditions, etc. (or establishment of the rules) to the rules, determines whether the vehicle is running on a level road in an urban district, or ascending or descending a winding road between mountains, or ascending a long, straight gently sloping road, and sets the optimum transmission stage adapted for the vehicle operating conditions, road conditions, driver's intention to drive, etc.

When setting the transmission stage by the fuzzy inference is finished, the controller 40 executes speed change operation by generating a speed change command signal, if the currently established transmission stage should be changed to a newly set optimum transmission stage (Step S18).

If the result of decision in Step S10 is YES, that is, if any of the sensors is found to be in trouble, on the other hand, the program proceeds to Step S13, whereupon the fuzzy inference is inhibited. Then, the program proceeds to Step S14, whereupon It is determined whether or not the speed change control can be effected in any other speed change control mode, other than that for the inhibited fuzzy inference. More specifically, it determines whether or not the speed change control can be effected with use of a shift map based on the normal mode, according to the present embodiment. In the normal-mode speed change control, the optimum transmission stage is selected from the shift map set in accordance with the vehicle velocity and throttle valve opening θ t. The speed change control based on the normal mode can be effected unless the sensors concerned in this mode, that is, the vehicle velocity sensor and the throttle opening sensor, go wrong or begin to operate abnormally. That is, unless a failure of at least one of the vehicle velocity sensor and the throttle opening sensor is detected.

If the result of decision in Step S14 is YES, the program proceeds to Step S16, whereupon the optimum transmission stage is set according to a conventional normal-mode shift map. If the currently established transmission stage should be changed to the optimum transmission stage newly set in Step S16, the controller 40 executes the speed change operation by generating the speed change command signal (Step S18).

If the throttle opening sensor 23 begins to operate abnormally, and therefore, the result of decision in Step S14 is NO, on the other hand, the program proceeds to Step S17. In Step S17, the transmission stage to be set is fixed to a predetermined stage, e.g., second gear stage (or third gear stage), which enables the vehicle at least to run, whereupon the program proceeds to Step S18. If the currently established transmission stage should be changed to the optimum transmission stage set in Step S17, the controller 40 executes the speed change operation by generating the speed change command signal in Step S18, as mentioned before.

In this manner, the speed change control mode is selected corresponding to the state of the sensors, normal or abnormal, and the optimum transmission stage is set according to the selected control mode.

Although a plurality of rules are set for fuzzy inference, as described above, all the signals from the various sensors are not used according to these individual rules.

More specifically, Rule 1, among the rules, is set in accordance with the vehicle velocity and brake operation only; Rule 2 is set in accordance with the engine speed and throttle opening only; and Rule 3 is set in accordance with the throttle opening and transverse acceleration only, for instance.

If any sensor is found to be in trouble (or is operating abnormally), only the conclusion of those rules in which the broken sensor (or sensor operating abnormally) is concerned are inhibited. Thus, the optimum transmission stage can be set according to the fuzzy rule based on those rules in which the normal sensors are concerned.

Any of a plurality of normal-mode shift maps may be selected if they include a shift map for high fuel-cost performance which can be set for an optimum transmission stage for a desired fuel-cost performance, a shift map for improved output which can be set for an optimum transmission stage for a desired output characteristic, a hold-mode shift map which can be set for a transmission stage suited for the starting of the vehicle on a snow-covered road or the like, etc.

The following is a description of troubleshooting methods for the individual sensors.

Figure 5:
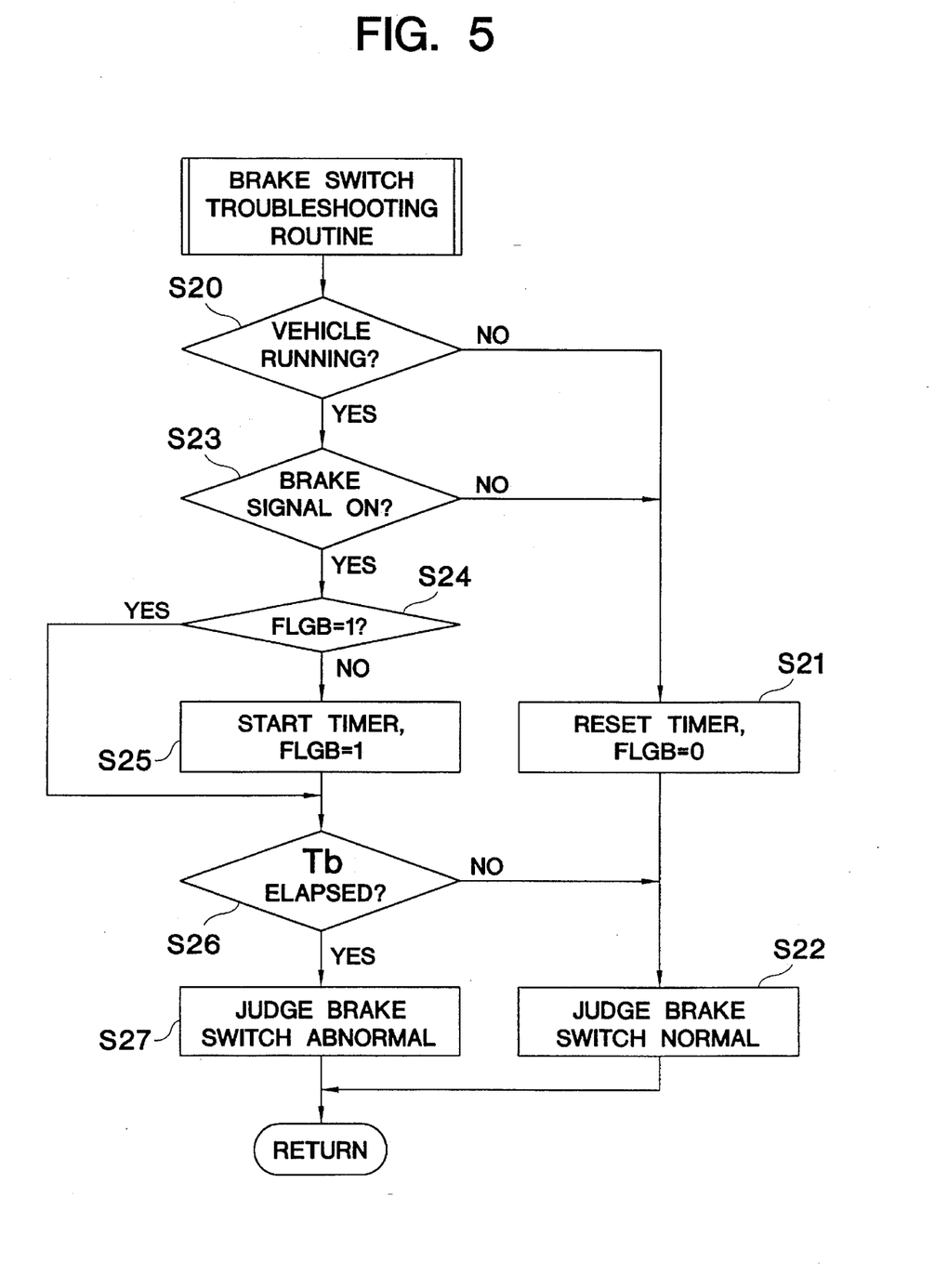
FIG. 5 is a flow chart showing a troubleshooting routine for a brake switch.

FIG. 5 shows a troubleshooting routine for the controller 40 to troubleshoot the brake switch 25. This troubleshooting routine is executed at intervals of a predetermined cycle by means of the controller 40. In each control cycle, the controller 40 first determines in Step S20 whether the vehicle is running or not. This decision is made by, for example, determining whether or not the vehicle velocity is not lower than (at least equal to) a predetermined value. If the vehicle is not running, a timer (counter in the controller 40) is reset, and also, the value of a flag FLGB is reset at 0, in Step S21. In this case, the controller 40 concludes that the brake switch 25 is normal (Step S22), whereupon the present routine terminates.

If the vehicle is found to be running, that is, if the result of decision in Step S20 is YES, the program proceeds to Step S23, whereupon it is determined whether a brake signal supplied from the brake switch 25 to the controller 40 is on or not. The brake switch 25 outputs an on-signal when the driver steps on the brake pedal, and delivers an off-signal when the brake pedal is released. If the result of decision in Step S23 is NO, the aforesaid processes of Steps S21 and S22 are executed. Also in this case, it is concluded that the brake switch 25 is normal (Step S22), whereupon the present routine terminates.

If it is concluded in Step S23 that the brake signal supplied from the brake switch 25 to the controller 40 is on, the controller 40 determines whether the flag value FLGB is 1 or not. The flag FLGB is indicative of a change of the brake signal from off to on. Immediately after the change of the brake signal from off to on, therefore, the flag value FLGB is not at 1. Accordingly, the process of Step S25 is executed to start the timer, and at the same time, set the flag FLGB at 1, whereupon the program proceeds to Step S26. After the flag FLGB is set at 1, on the other hand, the result of decision in Step S24 is YES. In this case, the program skips Step S25 and proceeds directly to Step S26.

In Step S26, it is determined whether or not a value obtained by means of the timer is greater than (exceeds) a value corresponding to a predetermined time period Tb. The predetermined time Tb is set at a value large enough to determine whether the brake switch 25 is in trouble or not (operating abnormally), e.g., 15 seconds. If it is concluded that the predetermined time Tb has not elapsed, the aforesaid process of Step S22 is executed, and It is concluded that the brake switch 25 is normal. If the result of decision in Step S26 becomes YES after the passage of the predetermined time Tb, on the other hand, the process of Step S27 is executed, and it is concluded that the brake switch 25 is abnormal (or in trouble).

That is, during the vehicle running, if the brake switch 25 is normal, then the possibility, that the on-signal which is indicative of the depression of the brake pedal can continue to be outputted for the predetermined time Tb, is quite unlikely. If the on-signal continues to be outputted, therefore, it is concluded that the brake switch 25 is operating abnormally and is in trouble.

Figure 6:
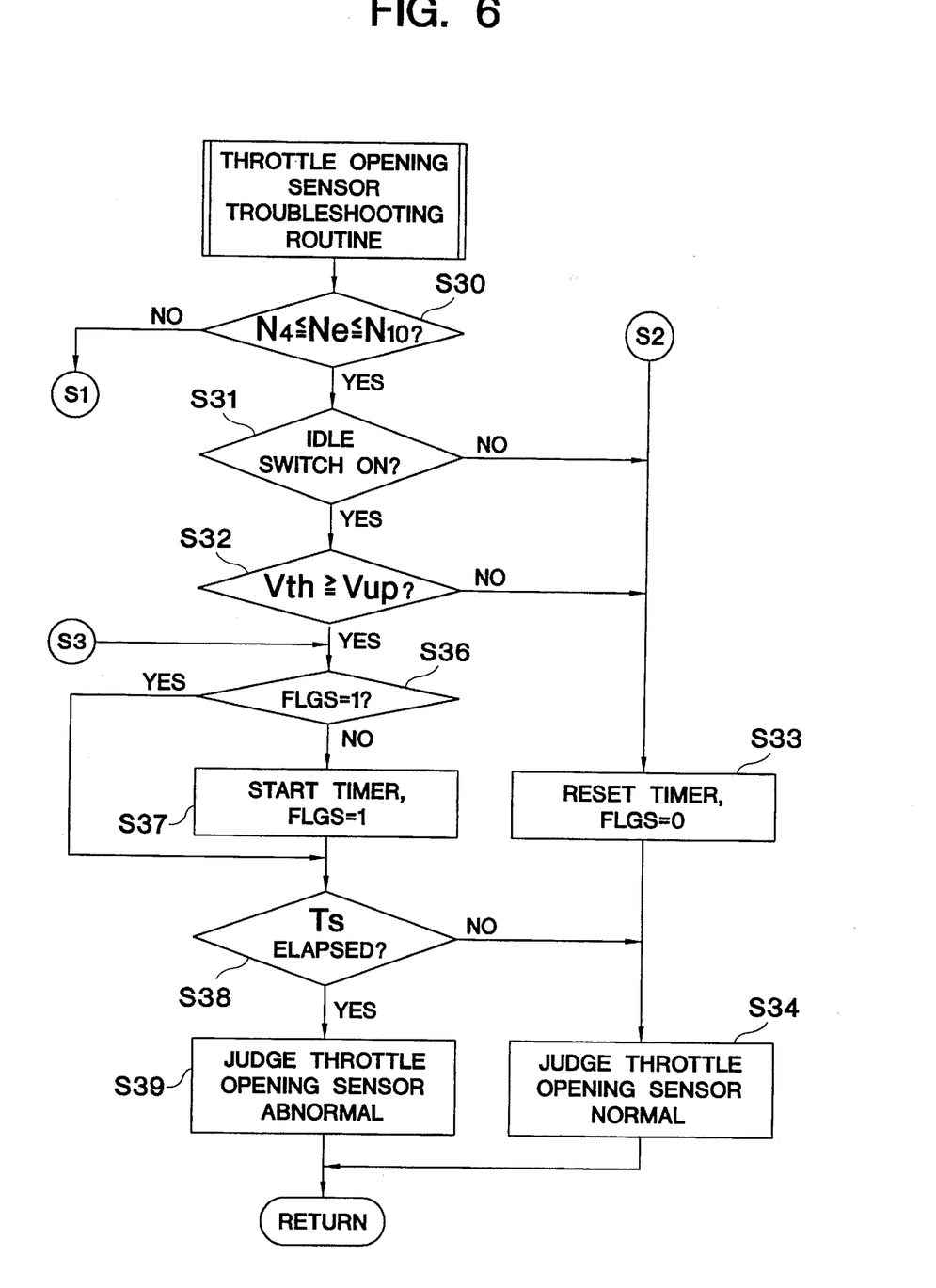
FIG. 6 is a flow chart showing part of a troubleshooting routine for a throttle opening sensor.
Figure 7:
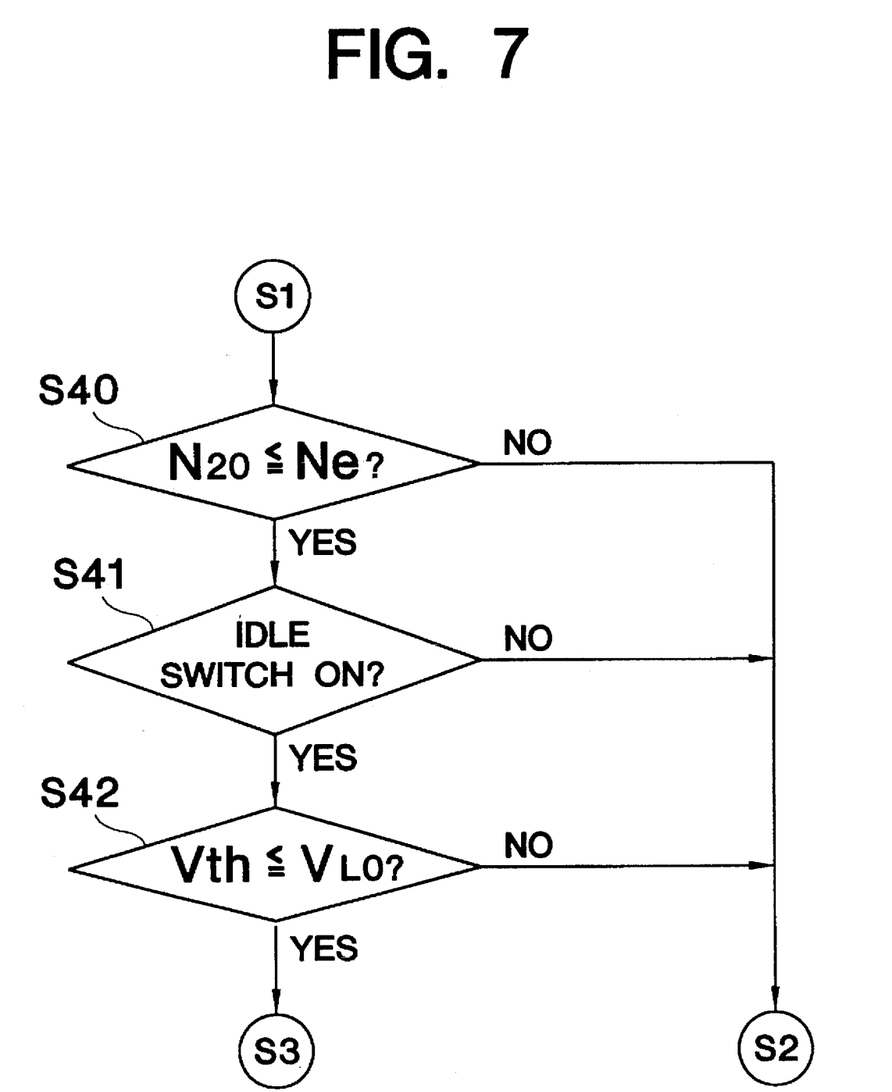
FIG. 7 is a flow chart showing the remainder of the routine partly shown in FIG. 6.

FIGS. 6 and 7 show a troubleshooting routine for the throttle opening sensor 23. This troubleshooting routine is also executed with a predetermined period by means of the controller 40. First, in Step S30, it is determined whether or not the engine speed Ne detected by means of the engine speed (Ne) sensor 26 is within a predetermined low-speed range (N4≦Ne≦N10). The upper and lower limit values N10 and N4 of the low-speed range may, for example, be 1,000 rpm and 400 rpm, respectively.

Different troubleshooting methods are used for the throttle opening sensor, depending on the engine speed range, high or low. If the result of decision in Step S30 is YES, the program proceeds to Step S31, whereupon it is determined whether the idle switch is on or not, that is, whether the throttle valve is closed or not. If the engine speed Ne is in the low-speed range, and if the throttle valve is open (i.e., result of decision in Step S31 is NO), the timer is reset, and also, the value of a flag FLGS is reset at 0, in Step S33. In this case, the controller 40 concludes that the throttle opening sensor 23 is normal (Step S34), whereupon the present routine terminates.

When the throttle valve is closed so that the idle switch 27 delivers the on-signal, the result of decision in Step S31 is YES, so that the process of Step S32 is executed. In this step, it is determined whether or not an output value Vth (output range: 0 to 5 V) of the throttle opening sensor 23 is greater than or equal to (at least equal to) a predetermined upper limit value Vup. This upper limit value Vup is set at a value indicative of a substantially fully open state of the throttle valve, e.g., 4.8 V. If the result of decision in Step S32 is NO, the aforesaid processes of Steps S33 and S34 are executed. Also in this case, it is concluded that the throttle opening sensor 23 is normal (Step S34), whereupon the present routine terminates.

If the output value Vth of the throttle opening sensor 23 is greater than or equal to the predetermined upper limit value Vup, that is, if the result of decision in Step S32 is YES, the controller 40 determines whether the flag value FLGS is 1 or not. The flag FLGS is indicative of a change of the result of decision in Step S32 from NO to YES. Immediately after the change of the output value Vth of the throttle opening sensor 23 to the predetermined upper limit value Vup or above, therefore, the flag value FLGS is not at 1. Accordingly, the process of Step S37 is executed to start the timer, and at the same time, set the flag FLGS at 1, whereupon the program proceeds to Step S38. If the flag FLGS is already at 1, on the other hand, the result of decision in Step S36 is YES. In this case, the program skips Step S37 and proceeds directly to Step S38.

In Step S38, it is determined whether or not a value measured by means of the timer is greater than a value corresponding to a predetermined time period Ts. The predetermined time Ts is set at a value large enough to determine whether the throttle opening sensor 23 is in trouble (operating abnormally) or not, e.g., 20 seconds. If it is concluded that the predetermined time Ts has not elapsed, the aforesaid process of Step S34 is executed, and it is concluded that the throttle opening sensor 23 is normal. If the result of decision in Step S38 becomes YES after the passage of the predetermined time Ts, on the other hand, the process of Step S39 is executed, and it is concluded that the throttle opening sensor 23 is abnormal (or in trouble).

That is, when a state, such that the output value Vth of the throttle opening sensor 23 is greater than or equal to the predetermined upper limit value Vup, is kept for the predetermined time Ts although the engine speed Ne is within the aforesaid low-speed range and the throttle valve is closed, it is concluded that the throttle opening sensor 23 is operating abnormally and is in trouble.

Then, if the result of decision in Step S30 is negative (NO), the process of Step S40 of FIG. 7 is executed, to determine whether or not the engine speed Ne is within a high-speed range greater than or equal to a predetermined speed N20 (e.g., 2,000 rpm). If the result of decision in this step is NO, that is, if the engine speed Ne has a value within a medium-speed range higher than N10 (1,000 rpm) and lower than N20 (2,000) or a value smaller than N4 (400 rpm), the aforesaid processes of Steps S33 and S34 are executed. In this case, it is concluded that the sensor 23 can be regarded as being normal, and the present routine terminates.

If the engine speed Ne is greater than or equal to N20 (2,000 rpm), that is, if the result of decision in Step S40 is YES, on the other hand, it is determined whether or not an off-signal is delivered from the idle switch 27. That is, it is determined whether the throttle valve is open or not (Step S41). If the result of the decision in this step is NO, that is, if the throttle valve is closed, the aforesaid processes of Steps S33 and S34 are executed. In this case, it is concluded that the sensor 23 can be regarded as being normal, and the present routine terminates. On the other hand, if the result of decision in Step S41 is YES, that is, if the throttle valve is open, it is determined whether or not the output value Vth of the throttle opening sensor 23 is less than or equal to (at most equal to) a predetermined lower limit value $V_{LO}$. This lower limit value $V_{LO}$ is set at a value indicative of a substantially fully closed state of the throttle valve, e.g., 0.2 V. If the result of decision in Step S42 is NO, the aforesaid processes of Steps S33 and S34 are executed. Also in this case, it is concluded that the throttle opening sensor 23 is normal (Step S34), whereupon the present routine terminates.

If the output value Vth of the throttle opening sensor 23 is less greater than or equal to the predetermined lower limit value $V_{LO}$, that is, if the result of decision in Step S42 is YES, the controller 40 proceeds to Step S36 and determines whether the flag value FLGS is 1 or not. Immediately after the change of the output value Vth of the throttle opening sensor 23 to the predetermined lower limit value $V_{LO}$ or below, the flag value FLGS is not at 1. In this case, the process of Step S37 is executed to start the timer, and at the same time, set the flag FLGS at 1. If the flag FLGS is already at 1, on the other hand, the result of decision in Step S36 is YES. In this case, the program skips Step S37 and proceeds directly to Step S38. In Step S38, as in the case of the troubleshooting operation for the low-speed range, it is determined whether or not the value measured by means of the timer is greater than the value corresponding to a predetermined time Ts. If it is concluded that the predetermined time Ts has not elapsed, the aforesaid process of Step S34 is executed, and it is concluded that the throttle opening sensor 23 is normal. If the result of decision in Step S38 becomes YES after the passage of the predetermined time Ts, on the other hand, the process of Step S39 is executed, and it is concluded that the throttle opening sensor 23 is abnormal (or in trouble).

That is, when a state that the output value Vth of the throttle opening sensor 23 is less than or equal to the predetermined lower limit value $V_{LO}$ is kept for the predetermined time Ts, although the engine speed Ne is within the high-speed range and the open state of the throttle valve is detected by means of the idle switch 27, it is concluded that the throttle opening sensor 23 is operating abnormally and is in trouble.

Figure 8:
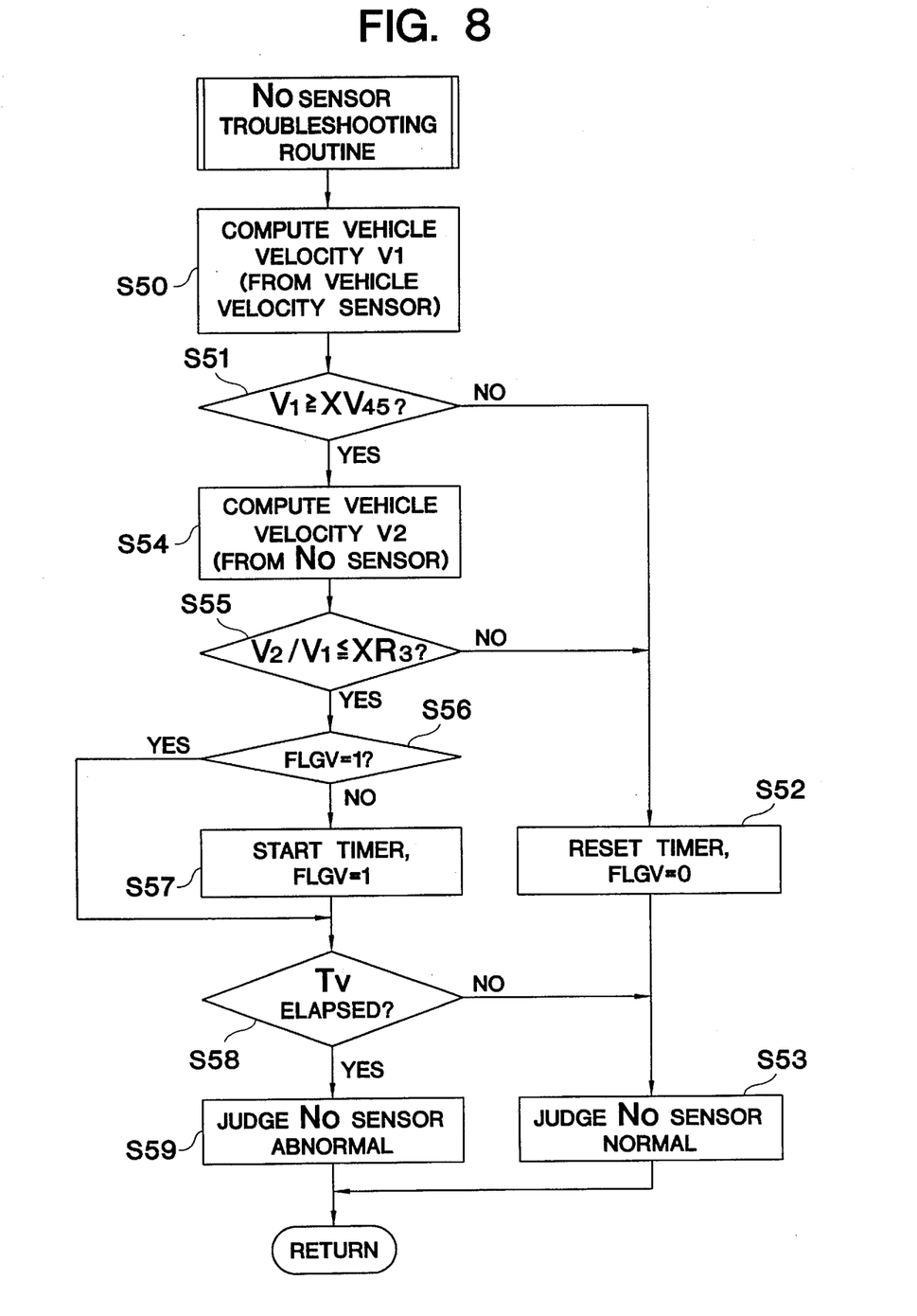
FIG. 8 is a flow chart showing a troubleshooting routine for an output shaft rotation speed (No) sensor.

FIG. 8 shows a troubleshooting routine for the output shaft rotation speed (No) sensor 22. First, in Step S50, the controller 40 computes a vehicle velocity V1 in accordance with vehicle velocity information from the vehicle velocity sensor 24. Then, the controller 40 determines whether or not the computed vehicle velocity V1 is greater than or equal to (at least equal to) a predetermined value XV45 (e.g., 45 km/hr) (Step S51). If the vehicle velocity V1 is lower than the predetermined value XV45, the controller 40 resets the timer and resets the value of a flag FLGV at 0 in Step S52. That is, if the vehicle is running at low speed, the controller 40 concludes that the No sensor 22 can be regarded as being normal (Step S53), whereupon the present routine terminates.

If the vehicle velocity V1 computed on the basis of the detection signal from the vehicle velocity sensor 24 is greater than or equal to the predetermined value XV45, that is, if the result of decision in Step S51 is YES, the program proceeds to Step S54, whereupon a vehicle velocity V2 is computed in accordance with rotation information from the No sensor 22. Then, the vehicle velocities V1 and V2 computed in this manner are compared, and it is determined whether or not the ratio (V2/V1) between them is less than or equal to (at most equal to) a predetermined value XR3 (e.g., 0.3) (Step S55). The predetermined value XR3 is set at a suitable value which can be obtained only when the No sensor 22 is operating abnormally and is in trouble. If the result of decision in Step S55 is NO, the aforesaid processes of Steps S52 and S53 are executed. Also in this case, it is concluded that the No sensor 22 is normal (Step S53), whereupon the present routine terminates.

If it is concluded in Step S55 that the ratio (V2/V1) is less than or equal to the predetermined value XR3, the controller 40 determines whether the flag value FLGV is 1 or not. The flag FLGV is a program control variable for storing a change of the ratio (V2/V1) to the predetermined value XR3 or below. Immediately after the change of the ratio (V2/V1) to the predetermined value XR3 or below, therefore, the flag value FLGV is not at 1. Accordingly, the process of Step S57 is executed to start the timer, and at the same time, set the flag FLGV at 1, whereupon the program proceeds to Step S58. If the flag FLGV is already at 1, on the other hand, the result of decision in Step S56 is YES. In this case, the program skips Step S57 and proceeds directly to Step S58.

In Step S58, it is determined whether or not a value measured by means of the timer is greater than a value corresponding to a predetermined time period Tv. The predetermined time Tv is set at a value large enough to determine whether the No sensor 22 is in trouble or not, e.g., 15 seconds. If it is concluded that the predetermined time Tv has not elapsed, the aforesaid process of Step S53 is executed, and it is concluded that the No sensor 22 is normal. If the result of decision in Step S58 becomes YES after the passage of the predetermined time Tv, on the other hand, the process of Step S59 is executed, and it is concluded that the No sensor 22 is abnormal (or in trouble).

Figure 9:
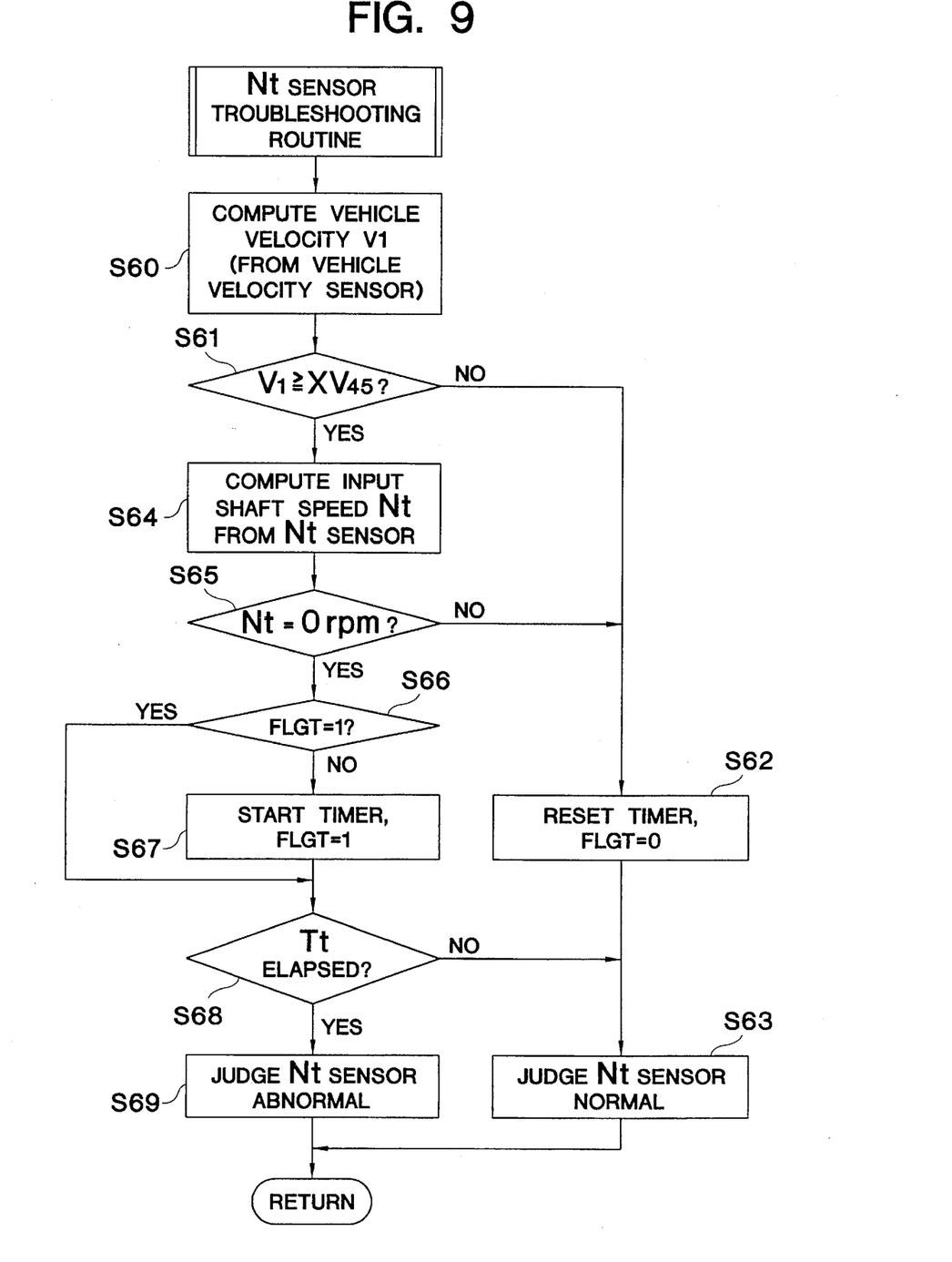
FIG. 9 is a flow chart showing a troubleshooting routine for an input shaft rotation speed (Nt) sensor.

FIG. 9 shows a troubleshooting routine for the input shaft rotation speed (Nt) sensor 21. First, in Step S60, the controller 40 computes the vehicle velocity V1 in accordance with the vehicle velocity information from the vehicle velocity sensor 24. Then, the controller 40 determines whether or not the computed vehicle velocity V1 is greater than or equal to (at least equal to) the predetermined value XV45 (e.g., 45 km/hr) (Step S61). If the vehicle velocity V1 is lower than the predetermined value XV45, the controller 40 resets the timer and resets the value of a flag FLGT at 0 in Step S62. If the vehicle is running at low speed, the controller 40 concludes that the Nt sensor 21 can be regarded as being normal (Step S63), whereupon the present routine terminates.

If the vehicle velocity V1 computed on the basis of the detection signal from the vehicle velocity sensor 24 is greater than or equal to the predetermined value XV45, that is, if the result of decision in Step S61 is YES, the program proceeds to Step S64, whereupon the input shaft rotation speed Nt is computed in accordance with rotation information from the Nt sensor 21. Then, it is determined whether or not the computed input shaft rotation speed Nt is 0 rpm (Step S65). The speed Nt cannot be 0 rpm during high-speed operation. If the result of decision in Step S65 is NO, therefore, the aforesaid processes of Steps S62 and S63 are executed. Also in this case, it is concluded that the Nt sensor 21 is normal (Step S63), whereupon the present routine terminates.

If the result of decision in Step S65 is YES, on the other hand, the controller 40 determines whether the flag value FLGT is 1 or not. The flag FLGT is a program control variable for storing the positive conclusion of the condition of Step S65. Immediately after the input shaft rotation speed Nt is made equal to 0 rpm, therefore, the flag value FLGT is not at 1. Accordingly, the process of Step S67 is executed to start the timer, and at the same time, set the flag FLGT at 1, whereupon the program proceeds to Step S68. If the flag FLGT is already at 1, on the other hand, the result of decision in Step S66 is YES. In this case, the program skips Step S67 and proceeds directly to Step S68.

In Step S68, it is determined whether or not a value measured by means of the timer is greater than a value corresponding to a predetermined time period Tt. The predetermined time Tt is set at a value large enough to determine whether the Nt sensor 21 is in trouble (operating abnormally) or not, e.g., 15 seconds. If it is concluded that the predetermined time Tt has not elapsed, the aforesaid process of Step S63 is executed, and it is concluded that the Nt sensor 21 is normal. If the result of decision in Step S68 becomes YES after the passage of the predetermined time Tt, on the other hand, the process of Step S69 is executed, and it is concluded that the Nt sensor 21 is abnormal (or in trouble).

Figure 10:
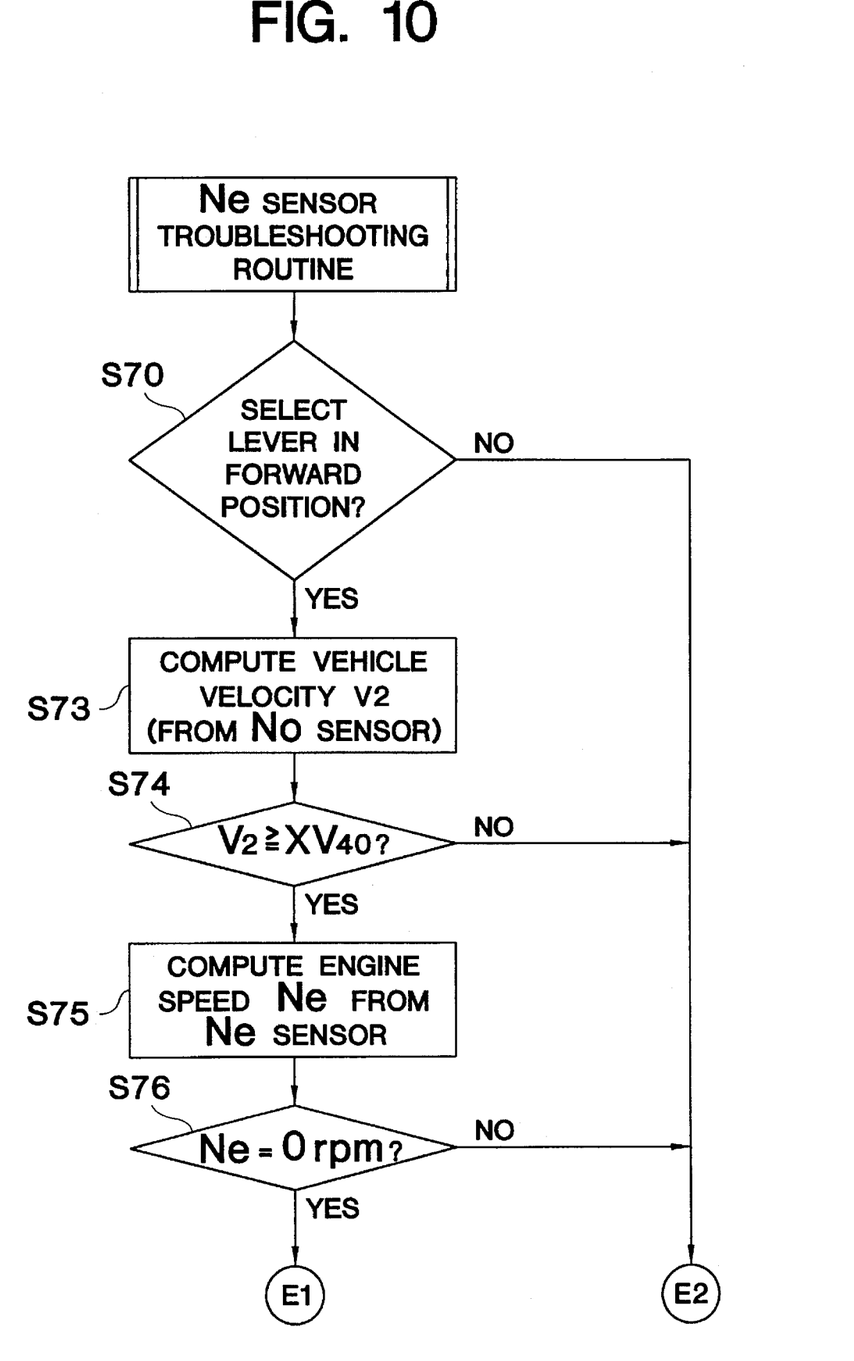
FIG. 10 is a flow chart showing part of a troubleshooting routine for an engine speed (Ne) sensor.
Figure 11:
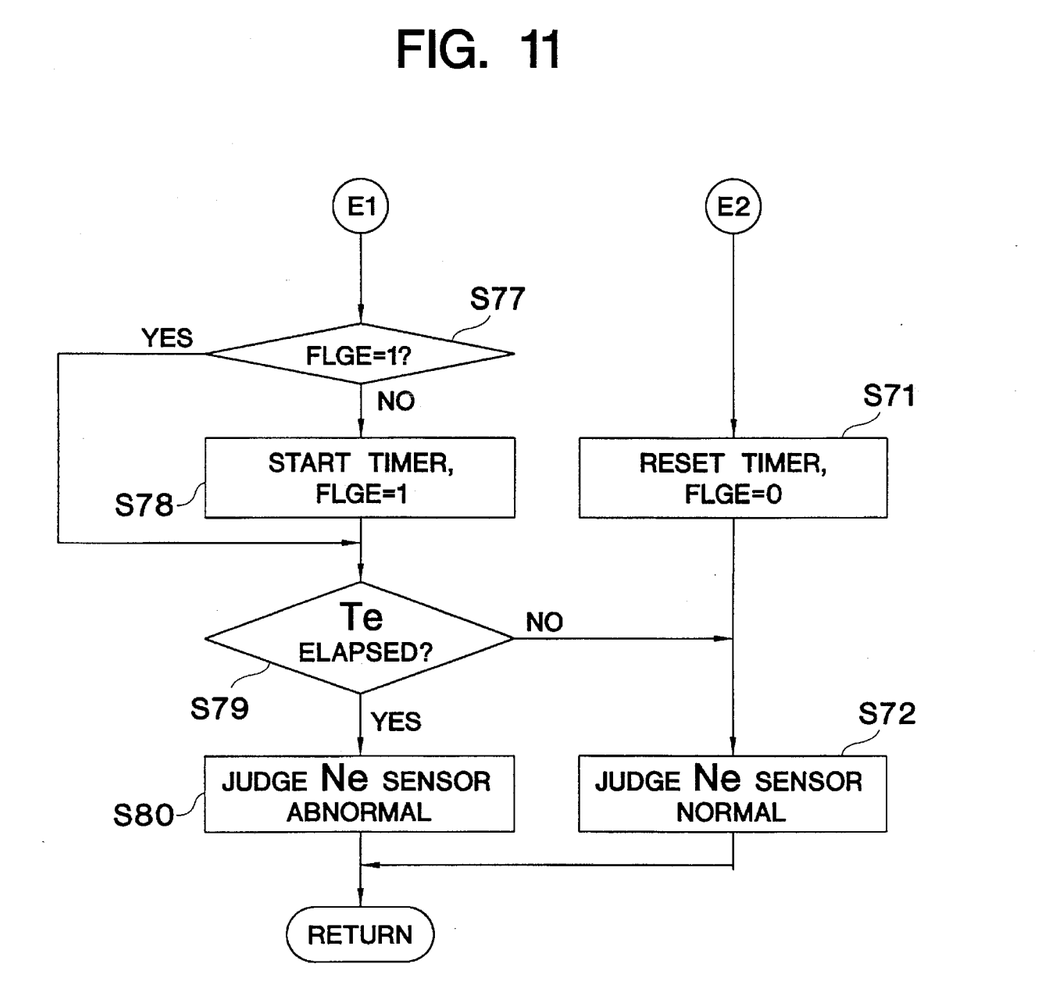
FIG. 11 is a flow chart showing the remainder of the routine partly shown in FIG. 10.

FIGS. 10 and 11 show a troubleshooting routine for the engine speed (Ne) sensor 26. First, in Step S70, the controller 40 it is determined whether or not the select lever is shifted to the forward-stage position, in accordance with a select lever shift signal from the inhibitor switch 28. If the result of decision in this step is NO, the controller 40 resets the timer and resets the value of a flag FLGE at 0 in Step S71 of FIG. 11. If the select lever is not shifted to the forward-stage position, the controller 40 concludes that the Ne sensor 26 is normal (Step S72), whereupon the present routine terminates.

If the result of decision in Step S70 is YES, the program proceeds to Step S73, whereupon the controller 40 computes the vehicle velocity V2 in accordance with the output shaft rotation information from the No sensor 22. Then, the controller 40 determines whether or not the computed vehicle velocity V2 is greater than or equal to (at least equal to) a predetermined value XV40 (e.g., 40 km/hr) (Step S74). If the vehicle velocity V2 is lower than the predetermined value XV40, the controller 40 resets the timer and resets the value of the flag FLGE at 0 in Step S71. Then, the controller 40 concludes that the Ne sensor 26 can be regarded as being normal (Step S72), whereupon the present routine terminates.

If the vehicle velocity V2 is greater than or equal to the predetermined value XV40, that is, if the result of decision in Step S74 is YES, the program proceeds to Step S75, whereupon the engine speed Ne is computed in accordance with rotation information from the Ne sensor 26. Then, it is determined whether or not the computed engine speed Ne is 0 rpm (Step S76). The speed Ne cannot be 0 rpm during high-speed operation. If the result of decision in Step S76 is NO, therefore, the aforesaid processes of Steps S71 and S72 are executed. Also in this case, it is concluded that the Ne sensor 26 is normal (Step S72), whereupon the present routine terminates.

If the result of decision in Step S76 is YES, on the other hand, the controller 40 proceeds to Step S77 of FIG. 11 and determines whether the flag value FLGE is 1 or not. The flag FLGE is a program control variable for storing the positive conclusion of the condition of Step S76. Immediately after the engine speed Ne is made equal to 0 rpm, therefore, the flag value FLGE is not at 1. Accordingly, the process of Step S78 is executed to start the timer, and at the same time, set the flag FLGE at 1, whereupon the program proceeds to Step S79. If the flag FLGE is already at 1, on the other hand, the result of decision in Step S77 is YES. In this case, the program skips Step S78 and proceeds directly to Step S79.

In Step S79, it is determined whether or not a value measured by means of the timer is greater than a value corresponding to a predetermined time period Te. The predetermined time Te is set at a value large enough to determine whether the Ne sensor 26 is in trouble (operating abnormally) or not, e.g., 15 seconds. If it is concluded that the predetermined time Te has not elapsed, the aforesaid process of Step S72 is executed, and it is concluded that the Ne sensor 26 is normal. If the result of decision in Step S79 becomes YES after the passage of the predetermined time Te, on the other hand, the process of Step S80 is executed, and it is concluded that the Ne sensor 26 is abnormal (or in trouble).

The troubleshooting methods for the various sensors have been described herein for purpose of illustration only. It is to be understood that the present invention is not limited to those methods, and may be also applied to various other troubleshooting methods.

From the above-described embodiment of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A troubleshooting method for a throttle opening sensor for detecting an opening amount of a throttle valve of an engine, comprising:

(a) detecting a rotation speed of said engine;

(b) determining, by use of a closed throttle state detecting device independent from said throttle opening sensor, whether said throttle valve is in said closed throttle state when said rotation speed of said engine is within a predetermined rotation speed range;

(c) detecting an output value of said throttle opening sensor when said throttle valve is determined to be in said closed throttle state;

(d) determining whether said output value of said throttle opening sensor is at least equal to a predetermined value;

(e) measuring a time period during which said output value is determined to be at least equal to the predetermined value; and (f) concluding that said throttle opening sensor is operating abnormally when said time period exceeds a predetermined time period.

2. The troubleshooting method according to claim 1, wherein said predetermined rotation speed range in said step (b) is set to an idling speed region of the engine.

3. The troubleshooting method according to claim 1, wherein said predetermined value in said step (d) is set to an output value of said throttle opening sensor obtained when said throttle valve is substantially fully open.

4. The troubleshooting method of claim 1, further comprising:

(g) setting an optimum transmission stage of an automatic transmission based at least on said output value of said throttle opening sensor when said throttle opening sensor is operating normally; and (h) inhibiting said optimum transmission stage from being set when it is concluded in said step (f) that said throttle opening sensor is operating abnormally.

5. The troubleshooting method of claim 4, wherein said step (g) comprises the substep of setting said optimum transmission stage by fuzzy inference.

6. The troubleshooting method of claim 4, wherein said step (h) comprises the substep of fixing said transmission stage to a predetermined transmission stage.

7. A troubleshooting method for a throttle opening sensor for detecting an opening amount of a throttle valve of an engine, comprising:

(a) detecting a rotation speed of said engine;

(b) determining, by use of a closed throttle state detecting device independent from said throttle opening sensor, whether said throttle valve is in said closed throttle state when said rotation speed of said engine is at least equal to an upper limit of a predetermined rotation speed range;

(c) detecting an output value of said throttle opening sensor when said throttle valve is determined to be open;

(d) determining whether said output value of said throttle opening sensor is at most equal to a predetermined value;

(e) measuring a time period during which said output value is determined to be at most equal to the predetermined value; and (f) concluding that said throttle opening sensor is operating abnormally when said time period exceeds a predetermined time period.

8. The troubleshooting method according to claim 7, wherein said predetermined rotation speed range in said step (b) is set to a region outside of an idling speed region of the engine.

9. The troubleshooting method according to claim 7, wherein said predetermined value in said step (d) is set to an output value of said throttle opening sensor obtained when said throttle valve is substantially fully closed.

10. A method for determining an abnormal state of a throttle opening sensor for detecting an opening amount of a throttle valve of an internal combustion engine, said engine having a closed state sensor for detecting a closed state of said throttle valve independent from said throttle opening sensor, comprising:

(a) detecting an output from said throttle opening sensor;

(b) detecting an output from said closed state sensor;

(c) determining a contradiction state when said output from said throttle opening sensor and said output from said closed state sensor contradict each other;

(d) measuring a time period of said contradiction state; and (e) determining that said throttle opening sensor is in said abnormal state when said time period continues for a period longer than a predetermined time period.

11. The method of claim 10, wherein said contradiction state is determined in said step (c) when a fully open state of said throttle valve is detected in said step (a), and said closed state of said throttle valve is detected in said step (b).

12. A method for determining an abnormal state of a throttle opening sensor for detecting an opening amount of a throttle valve of an internal combustion engine, said engine having a closed state sensor for detecting a closed state of said throttle valve independent from said throttle opening sensor, comprising:

(a) detecting an output from said throttle opening sensor;

(b) detecting a rotational speed of said engine;

(c) detecting an output from said closed state sensor;

(d) determining a contradiction state when at least two of said detected output from said throttle opening sensor, said detected rotational speed, and said detected output from said closing state sensor contradict each other;

(e) measuring a time period of said contradiction state; and (f) determining that said throttle opening sensor is in said abnormal state when said time period continues for a period longer than a predetermined time period.

13. The method of claim 12, wherein said contradiction state is determined in said step (d) when (d1) a fully open state of said throttle valve is detected in said step (a), (d2) said rotational speed detected in said substep (b) is higher than a predetermined rotational speed, and (d3) said closed state of said throttle valve is detected in said step (c).

14. The troubleshooting method of claim 7, further comprising:

(g) setting an optimum transmission stage of an automatic transmission based at least on said output value of said throttle opening sensor when said throttle opening sensor is operating normally; and (h) inhibiting said optimum transmission stage from being set when it is concluded in said step (f) that said throttle opening sensor is operating abnormally.

15. The troubleshooting method of claim 14, wherein said step (g) comprises the substep of setting said optimum transmission stage by fuzzy inference.

16. The troubleshooting method of claim 14, wherein said step (h) comprises the substep of fixing said transmission stage to a predetermined transmission stage.

* * * * *